United States Patent
Leigh

(10) Patent No.: US 6,728,787 B1
(45) Date of Patent: Apr. 27, 2004

(54) SYSTEM AND METHOD FOR LOCATING AND INSTALLING DEVICE DRIVERS FOR PERIPHERAL DEVICES

(75) Inventor: Darren L. Leigh, Belmont, MA (US)

(73) Assignee: Mitsubishi Electric Research Labs, INC, Cambridge, MA (US)

( * ) Notice: Subject to any disclaimer, the term of this patent is extended or adjusted under 35 U.S.C. 154(b) by 0 days.

(21) Appl. No.: 09/540,743

(22) Filed: Mar. 31, 2000

(51) Int. Cl.⁷ ............................... G06F 9/00; G06F 9/46
(52) U.S. Cl. ..................... 709/327; 709/321; 709/322; 709/323; 709/324; 709/325; 709/326; 713/1; 713/2; 713/100; 717/178
(58) Field of Search ................. 709/321–327; 717/168–178; 713/1, 2, 100

(56) References Cited

U.S. PATENT DOCUMENTS

| | | | | |
|---|---|---|---|---|
| 5,581,766 A | * | 12/1996 | Spurlock ................. | 713/2 |
| 6,023,585 A | * | 2/2000 | Perlman et al. .......... | 717/178 |
| 6,026,366 A | | 2/2000 | Grube .................... | 705/10 |
| 6,081,850 A | * | 6/2000 | Garney .................. | 710/15 |
| 6,424,424 B1 | * | 7/2002 | Lomas et al. ............ | 358/1.14 |
| 6,473,854 B1 | * | 10/2002 | Fleming, III ............ | 713/1 |
| 6,493,770 B1 | * | 12/2002 | Sartore et al. ........... | 710/8 |

* cited by examiner

Primary Examiner—John Follansbee
Assistant Examiner—Diem Cao
(74) Attorney, Agent, or Firm—Dirk Brinkman; Andrew Curtin

(57) ABSTRACT

A destination computer reads a device identification and a network address from a peripheral device connected to the destination computer. A device driver, corresponding to the device identification, is then retrieved from the source computer at the network address. A device driver installation program can also be retrieved from the source computer. The device driver installation program is executed in the destination computer to determine the configuration of the destination computer. The destination computer requests the device driver for the peripheral device corresponding to the configuration of the destination computer from the source computer. The device driver is installed in the destination computer.

21 Claims, 3 Drawing Sheets

SYSTEM AND METHOD FOR LOCATING AND INSTALLING DEVICE DRIVERS FOR PERIPHERAL DEVICES

FIELD OF THE INVENTION

The present invention relates generally to computer peripheral device drivers, and more particularly, to downloading device drivers over a network.

BACKGROUND OF THE INVENTION

As more and more computers enter homes and offices, consumers are demanding that their computer systems operate in a "user-friendly" manner while performing more tasks at faster rates. In response to this demand, manufacturers are continuously increasing a computer's capabilities and computing power. However, the complexity of the programs that operate the computer system has also increased, making many aspects of computer operation less than user-friendly. This includes programs that install and operate peripheral devices ("devices").

In particular, there has been a great increase in the types and varieties of peripheral devices available to computer users, e.g., keyboards, disk drives, printers, video cameras, etc. When a new device is added to a computer system, a complimentary device driver ("driver") must exist in the computer's memory. The driver, while executing, allows the device to operate with the computer and its operating system. If a device is not operable under an already existing driver, a new driver must be installed. Typically, a driver is supplied by the maker of the device on a computer-readable media, i.e., floppy disk or CD-ROM, and is installed in the computer system in accordance with a procedure established by a user interface and the operating system. Drivers can also be installed over the Internet.

Current installation procedures make it necessary for the user to perform many of these driver installation steps manually. For example, in the case of a floppy disk or CD-ROM, the user must manually insert the disk. Often, a user must then respond to a series of queries or prompts to install the driver onto the computer.

Installing a device driver from the Internet often requires a user to locate the particular site, determine what device driver is needed for the user's particular computer system, and then download the driver. As a result, the installation and set-up of a new peripheral device can be extremely difficult for the novice computer user.

Also, the user must often access the computer in a privileged mode, i.e., root, superuser, administrator, etc., to install the device driver. This gives an enduser control of the computer's operating system, as well as all of the hardware. With this control, the end-user can now bypass any security provisions, and potentially damage or corrupt the computer system.

Therefore, it is desired to provide a system and method for installing device drivers onto computers that require minimal or no user interaction.

SUMMARY OF THE INVENTION

The present invention provides for the automatic identification and installation of software device drivers over a computer network for the operation of computer hardware peripheral devices. A hardware peripheral device is connected to a destination computer. The peripheral device contains a network address, e.g., a Universal Resource Locator (URL). After the computer's operating system recognizes the device, the destination computer reads the network address and directs the computer's operating system towards a web site.

A source computer, storing an installation program and device drivers, is located at this site. A device driver is selected based on the information provided from the peripheral device, and installed in the memory of the destination computer.

In the alternative, an installation program is retrieved from the source computer. The installation program generates a configuration specification based on memory capacity and the type of operating system of the destination computer, as well as the type, make and model of the peripheral device. This information is used to select and retrieve the corresponding device driver file from the source computer for installation in the destination computer.

DETAILED DESCRIPTION OF THE PREFERRED EMBODIMENT

System Overview

Figure 1:
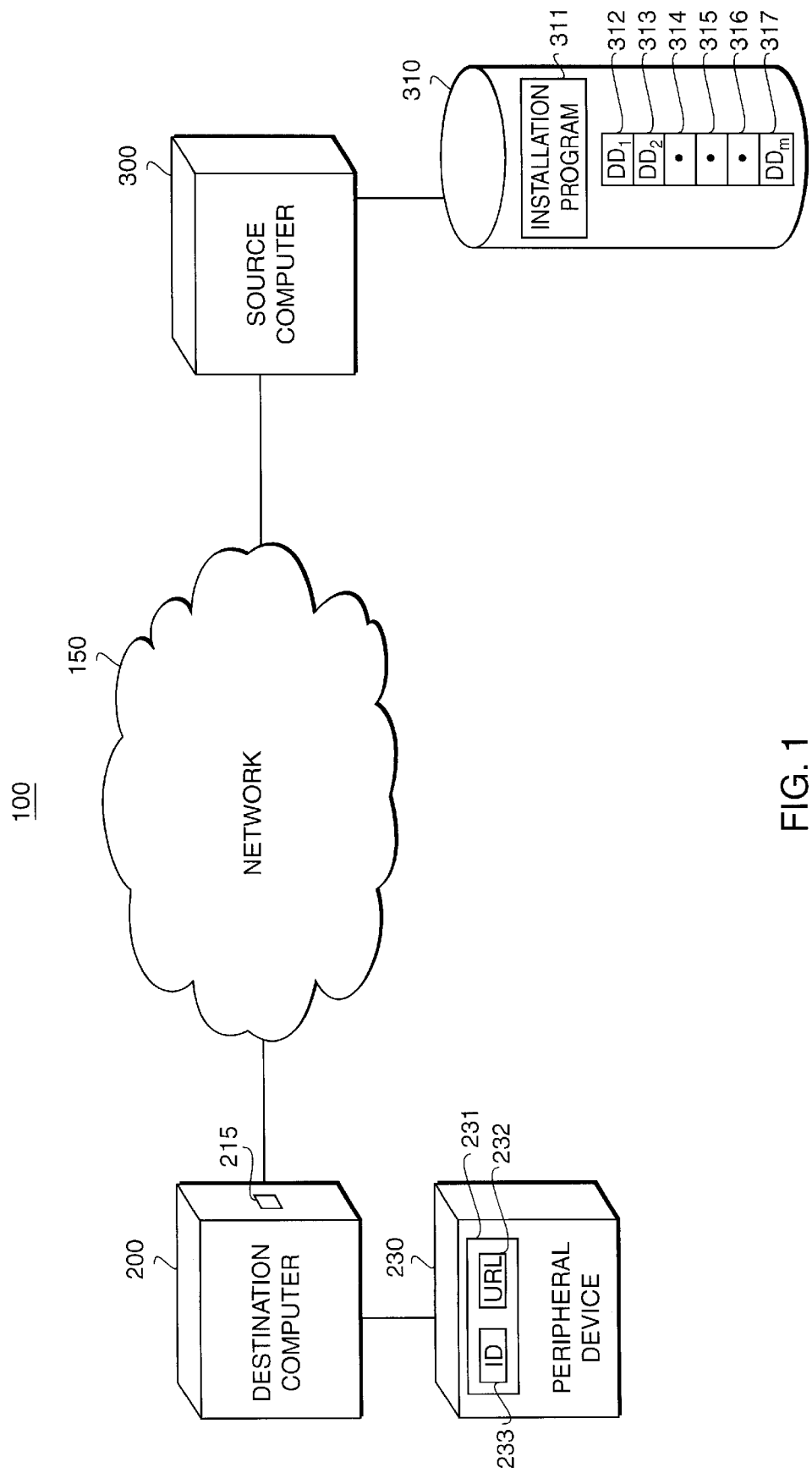
FIG. 1 is a block diagram of a system for identifying and installing device drivers according to the present invention.

As shown in FIG. 1, my invention provides a system 100 for automatically locating, identifying, and installing device drivers. The system 100 includes a destination computer 200 linked via a network 150 to a source computer 300. The destination computer includes a peripheral device 230. The peripheral device includes a non-volatile memory device 231 for storing a network address 232 and a device identification (ID) 233. The source computer 300 includes a database 310 for storing an installation program 311, and device drivers 312–317.

Destination Computer

Figure 2:
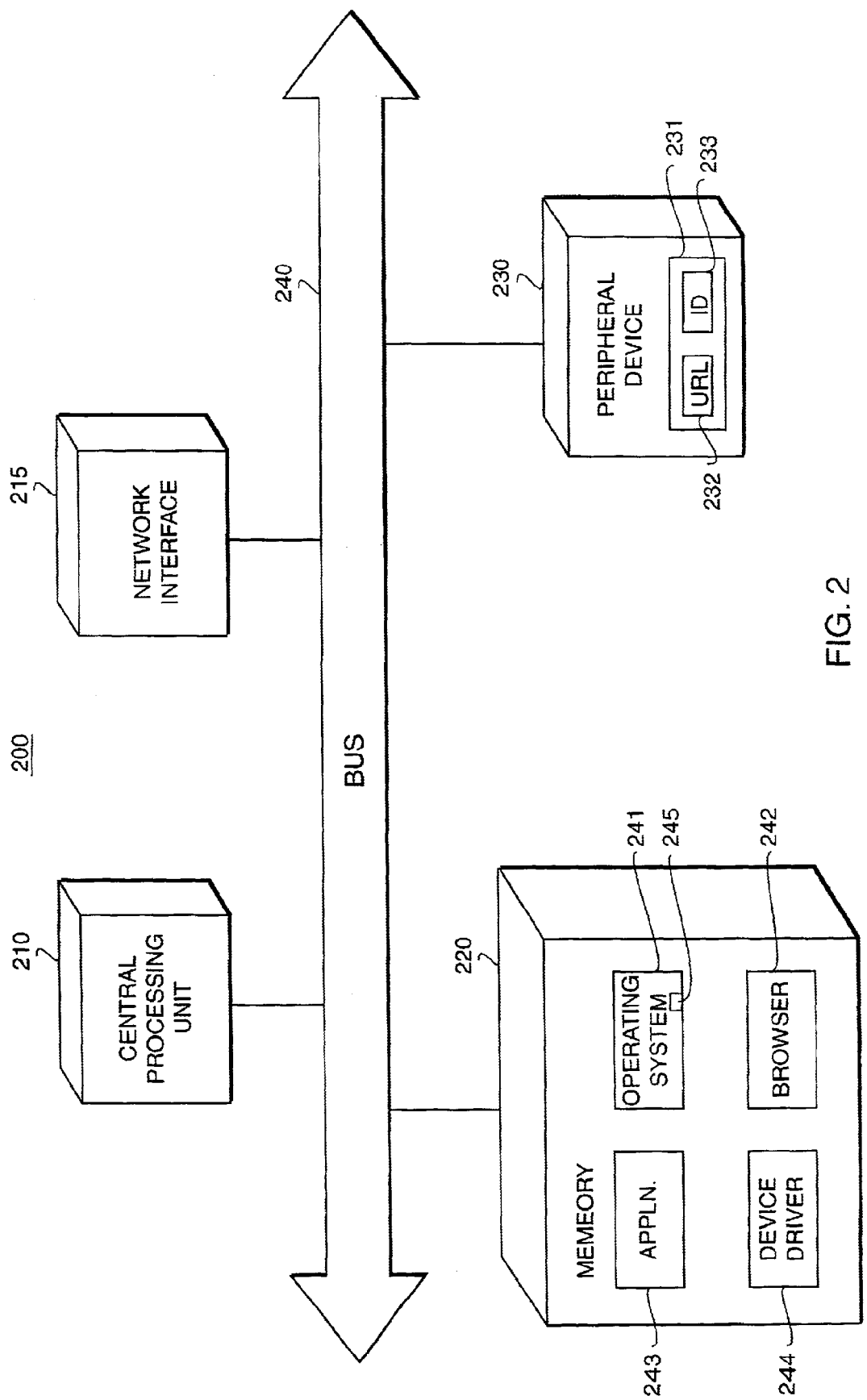
FIG. 2 is a block-diagram of a computer system that uses the invention.

The destination computer 200 according to the invention is illustrated in greater detail in FIG. 2. The destination computer 200 includes a central processing unit (CPU) 210, such as an Intel™ Pentium Microprocessor, a memory 220, and a peripheral device 230. The peripheral device 230 includes a computer chip 231 containing a network address 232. The memory 220 includes an operating system 241, a browser 242, application programs 243 and device drivers 244. The operating system 241 includes code 245 for reading the network address 232. Some examples of possible operating systems 241 include Microsoft Windows™, Windows NT™, Unix™, Linux™, etc. Types of browsers include Netscape™, Microsoft Explorer™ or any browser that is suitable for establishing a connection to a network. The components are connected to a bus system 240.

The network can be a local-area network (LAN) or a wide-area network (WAN), such as the Internet.

The present invention can operate in a wide variety of computer systems. For instance, the destination computer 200 can be a personal computer (PC), a laptop, a palmtop, a workstation, a mainframe, or some other system capable of executing software and connecting to a network.

Peripheral Device

The destination computer 200 includes a peripheral device 230. The peripheral device 230, e.g., keyboards, mice, floppy/CD-ROM drives, displays, printers, video cameras, and the like, includes a memory device 231 that is readable by the operating system 241 or the application programs 243. The memory device 231 can be a register, or the like, and stores the device identification (ID) 233, and a network address 232, such as a Universal Resource Locator (URL). A network interface 215 links the destination computer 200 to the network 150.

Source Computer

The source computer 300 includes a database 310, storing an installation program 311, and device drivers 312–317. The installation program 311 can be a Java™ or ActiveX™ applet or a similar means for determining the configuration of a computer system. Device drivers 312–317 include drivers designed for use with different makes and models of peripheral devices, and compatible with a wide variety of operating systems.

Operation of System

Figure 3:
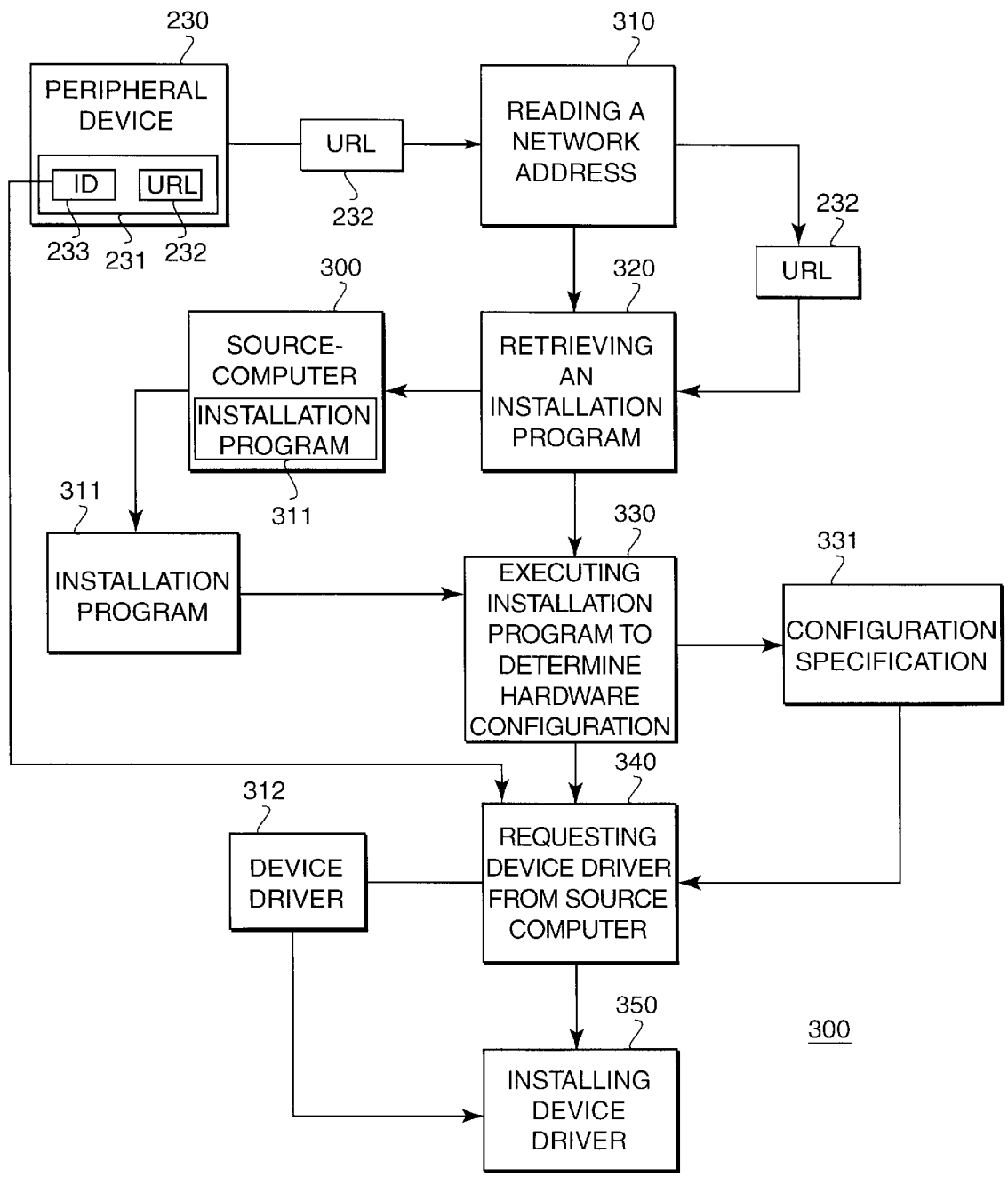
FIG. 3 is a flow diagram of a method for installing a device driver according to the invention.

FIG. 3 shows steps of a method 300 for locating and installing software device drivers over a network according to the invention. In step 310, the destination computer, using the code 245 of the operating system, reads the network address 232 stored in the memory device 231, and engages the network interface 215, connecting the destination computer 200 to the network 150.

In an optional step 320, a request for the installation program 311 is made to the source computer. In response to the request, the requested installation program 311 is sent over the network 150 to the destination computer 200.

If the installation program 311 is executed in the destination computer 200 in step 330. The installation program 311 obtains a configuration specification 331 based on the memory 220, the bus 240, and the operating system 241 of the destination computer 200, as well as the device identification (ID) 233 based on the type, make and model of peripheral device 230.

In the preferred embodiment, step 340 requests a corresponding device driver from the source computer in accordance with the configuration specification 331 and the device ID 233. In response, the corresponding device driver 312 is retrieved and sent to the destination computer 200.

In step 350, the device driver 312 is installed in the memory 220 of the destination computer 200. After the device driver 312 is installed, the peripheral device 230 is ready to use.

The same method can also be used to download upgrades for software device drivers over the network. Also, firmware updates can be downloaded and installed onto the peripheral device using this method.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for installing a device driver for a peripheral device in a destination computer connected to a source computer via a communications network, comprising the steps of:

reading, by the destination computer, the peripheral device to obtain a network address and a device identification;

retrieving, by the destination computer, a device driver installation program at the network address from the source computer;

executing the device driver installation program in the destination computer to determine a configuration of the destination computer;

requesting the device driver according to the configuration of the destination computer, as determined by the installation program and the device identification, from the source computer; and installing the device driver in the destination computer.

2. The method of claim 1 wherein the reading of the network address is performed by an operating system of the destination computer.

3. The method of claim 1 wherein the peripheral device stores the device identification and the network address in a memory device.

4. The method of claim 1 where the network address is a Universal Resource Locator.

5. The method of claim 1 wherein the source computer stores the device driver installation program and the device driver in a database.

6. The method of claim 6 wherein the configuration of the destination computer is determined according to a memory, a bus, and an operating system of the destination computer.

7. The method of claim 5 wherein the database contains a plurality of device drivers for use with a plurality of makes, models, and types of peripheral devices and are compatible with a plurality of operating systems.

8. The method of claim 1 where the device driver installation program is a Java™ applet.

9. The method of claim 1 where the device driver installation program is an ActiveX™ applet.

10. The method of claim 1 wherein the device identification is determined according to a make, model and type of device.

11. The method of claim 1 wherein the device driver is installed in the memory of the destination computer.

12. A system for installing a device driver for a peripheral device, comprising:

a destination computer, having a predetermined configuration, and including a peripheral device storing a network address and a device identification;

a source computer, connected to the destination computer by a network, including an installation program, located at the network address, the installation program executable in the destination computer; and a device driver compatible with the predetermined configuration of the destination computer and the device identification.

13. The system of claim 12 wherein the peripheral device includes a memory device to store the device identification and the network address.

14. The system of claim 12 wherein the network address is a Universal Resource Locator.

15. The system of claim 12 wherein the destination computer further includes an operating system for reading the network address.

16. The system of claim 12 wherein the installation program and the device driver are located at the network address.

17. The system of claim 12 wherein the source computer includes a database to store the device driver installation program and the device drivers.

18. The system of claim 17 wherein the database includes device drivers for use with a plurality of makes, models, and types of peripheral devices and are compatible with a plurality of operating systems.

19. The system of claim 17 wherein the device driver installation program is a Java applet.

20. The system of claim 12 wherein the configuration of the destination computer is determined according to a memory, a bus, and an operating system of the destination computer.

21. The system of claim 12 wherein the destination computer includes a memory device for storing the device driver.

* * * * *